United States Patent [19]

Nagashima

[11] Patent Number: 4,661,871

[45] Date of Patent: Apr. 28, 1987

[54] REGULATING APPARATUS AND METHOD FOR USE WITH ROTARY MAGNETIC RECORDING SHEET PERMITTING IMPROVED HEAD CONTACT

[75] Inventor: Yasuo Nagashima, Kaisei, Japan

[73] Assignee: Fuji Photo Film Co., Ltd., Kanagawa, Japan

[21] Appl. No.: 613,065

[22] Filed: May 22, 1984

[30] Foreign Application Priority Data

May 23, 1983 [JP] Japan .................................. 58-89100

[51] Int. Cl.⁴ ..................... G11B 5/016; G11B 5/012; G11B 23/03; G11B 5/54

[52] U.S. Cl. ........................................ 360/99; 360/97; 360/133; 360/105

[58] Field of Search ..................... 360/97, 98, 99, 133, 360/130.2, 130.21, 135, 137, 105

[56] References Cited

U.S. PATENT DOCUMENTS

| 4,074,330 | 2/1978 | Norton et al. | 360/99 |
| 4,388,368 | 6/1983 | Hibino et al. | 428/336 |
| 4,414,592 | 11/1983 | Losee et al. | 360/99 |
| 4,466,032 | 8/1984 | Saito | 360/99 |

FOREIGN PATENT DOCUMENTS

| 54-17708 | 9/1979 | Japan | 360/99 |
| 55-157161 | 12/1980 | Japan | 360/99 |
| 57-113460 | 7/1982 | Japan | 360/97 |
| 57-113459 | 7/1982 | Japan | 360/97 |
| 57-113466 | 7/1982 | Japan | 360/99 |
| 58-17519 | 2/1983 | Japan | 360/125 |
| 59-33666 | 2/1984 | Japan | 360/99 |

OTHER PUBLICATIONS

IBM Technical Disclosure Bulletin vol. 6, No. 9, Feb. 1964, pp. 57–58, "Pressure Pad for Magnetic Heads" by Bond.

IBM Technical Disclosure Bulletin vol. 18, No. 3, Aug. 75, pp. 895–896, "Magnetic Disk . . . End-To-End" by Bowen.

Primary Examiner—John H. Wolff
Assistant Examiner—Alfonso Garcia
Attorney, Agent, or Firm—Birch, Stewart, Kolasch & Birch

[57] ABSTRACT

A guide system is used with a rotary magnetic recording sheet applicable to a system and method which includes a regulator plate and performs magnetic recording or playback by protruding a magnetic head beyond a regulation level of a recording surface of a rotatable sheet of magnetic recording medium. The regulator plate is located to contact the back surface of the magnetic recording medium and held in such a relative position to the recording medium that the regulation level of the recording surface of the recording medium is protruded toward the recording surface beyond a non-regulation level of the recording surface.

16 Claims, 18 Drawing Figures

A PERIOD OF FULL TURN OF DISC

REGULATING APPARATUS AND METHOD FOR USE WITH ROTARY MAGNETIC RECORDING SHEET PERMITTING IMPROVED HEAD CONTACT

BACKGROUND OF THE INVENTION

The present invention is related to the invention decribed in copending application Ser. No. 613,066, filed May 22, 1984, said application being assigned to the same assignee as the present invention.

1. Field of the Invention

The present invention relates to a guide system for a rotary magnetic disc. More particularly, the present invention relates to a rotary magnetic disc guide system for use with a system which includes a regulator plate and performs magnetic recording or playback by protruding a magnetic head beyond a regulation level of a rotatable sheet of magnetic recording medium.

2. Description of the Prior Art

Generally, a flexible magnetic disc has a thin disc sheet which is encased in a jacket. During a recording or playback mode of operation, only the thin disc sheet in the jacket is rotated while a magnetic head, or transducer, is held in contact with the disc sheet through an opening formed in the jacket. So long as the disc has a relatively large diameter, it is prevented from swaying or warping when the head is protruded or thrust toward it due to a centrifugal force developing in the disc, allowing the head to stably abut against the disc.

Concerning a disc having a relatively smaller diameter, however, the centrifugal force is smaller than one acting on the larger diameter disc so that protruding the head toward the disc causes a recording surface of the disc to warp away from the head. Such instability of contact of the head with the disc is brought about in the case where the disc accommodated in a jacket has a smaller diameter, such as about 5 centimeters (cm). Needless to say, accuracy of abutment or contact of the head against the recording surface of the disc is a primary requisite for stable recording or playback of signals. The above-mentioned warping, or swaying, of the head degrades the accuracy of abutment and, thereby, prevents signals from being recorded or reproduced with stability.

In the light of this, there has been proposed a construction which regulates the warping of a disc sheet away from a head, or toward the back of the disc sheet where the head is absent, when the head is thrusted or projected into contact with the disc sheet, as disclosed in Japanese Patent Laid-Open Publication Nos. 113459/1982 and 113460/1982, for example. The regulation is implemented by a regulator plate or board which has a recess so shaped as to regulate or limit warping of the sheet and presses against that part of the back of the sheet which corresponds in position to the head.

However, I have found that the mechanism relying simply on the regulator plate is not always successful to provide desirable contact of a head with the recording surface of a disc sheet.

One of the causes of such unstable head-disc contact is the physical curling of a magnetic disc itself.

Figure 1:
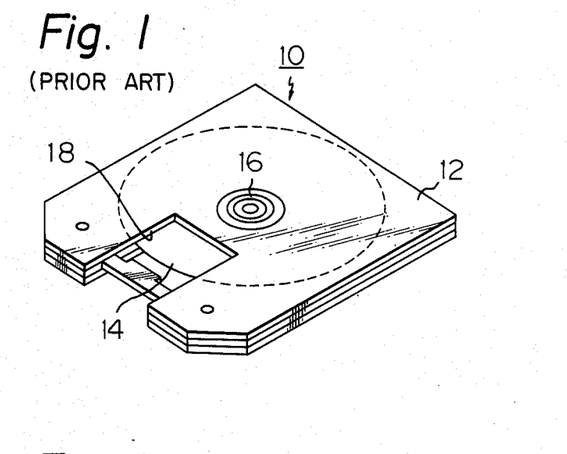
FIG. 1 is a perspective view showing an example of flexible magnetic discs.

The situation concerned with curling will be discussed in relation with a prior art flexible magnetic disc. As shown in FIG. 1, a flexible magnetic disc, generally designated by reference numeral 10, comprises a jacket 12 in which a magnetic recording sheet 14 is housed. In an exemplary configuration, the jacket 12 may be dimensioned about 5 cm at each side while the sheet 14 may have a diameter of about 5 cm and a thickness of about 40 microns ($\mu$m). A hub, or core, 16 is rigidly mounted on a radially central area of the sheet 14 so that it may be chucked by a rotary drive shaft through a central opening of the jacket 12 in order to impart rotation to the sheet 14. The jacket 12 has another opening 18 which allows the regulator plate and the magnetic head to abut associatedly against the opposite surfaces of the sheet 14.

Figure 2:
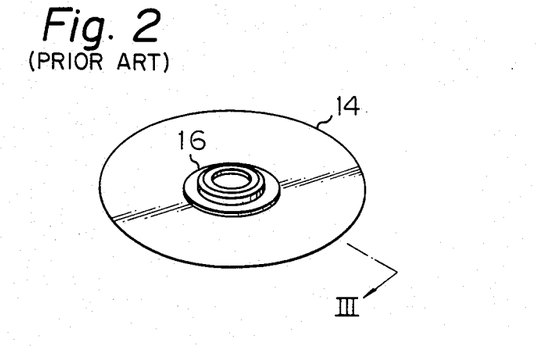
FIG. 2 is a perspective view of a magnetic sheet included in the magnetic disc shown in FIG. 1.
Figure 3:
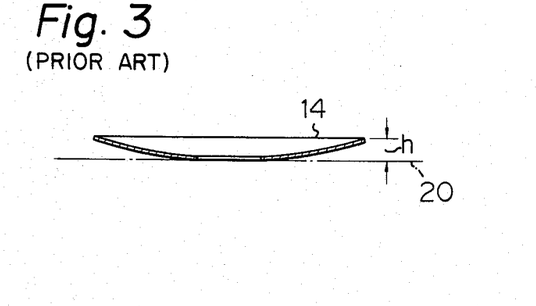
FIG. 3 is a cross-sectional view exaggeratedly representative of curling of the magnetic sheet.

The sheet 14 has such a configuration as one shown in FIG. 2. FIG. 3 shows the sheet 14 with the core 16 removed and in a section along line III of FIG. 2, representing a curled condition of the sheet 14. In FIG. 3, the degree of curling of the sheet 14 is indicated in terms of the height h of the circumferential edge of the sheet 14 measured from a reference plane or level 20. The curl h may be measured by, for example, laying a magnetic sheet gently on a flat plate under a room temperature and humidity condition.

Usually, an auxiliary or additional layer referred to as "balance coating" is deposited on that surface of a base material, or support member. The balance coating is deposited on the opposite surface to the recording surface in order to cope with curling. The auxiliary layer is ordinarily made of a material which is substantially common to the material constituting a recording material layer. Nevertheless, curling of a magnetic sheet is unavoidable due to the influence of biaxial stretching to the sheet resultant from the production of the base material of the sheet, and also to the influence of subtle changes in ambient conditions in the course of production. Further, curling may occur while a core is shaped on the sheet.

Even though a curl of the sheet at the production stage may be eliminated, it may be brought about by aging of the sheet. Additionally, where such a magnetic disc is used with an electronic still camera, it is quite difficult to free the disc from curling under, for example, ordinary conditions of use of a camera, that is, a hot and humid condition to a cold and dry condition. Curling is, therefore, physically inevitable although to one degree or another.

Figure 4:
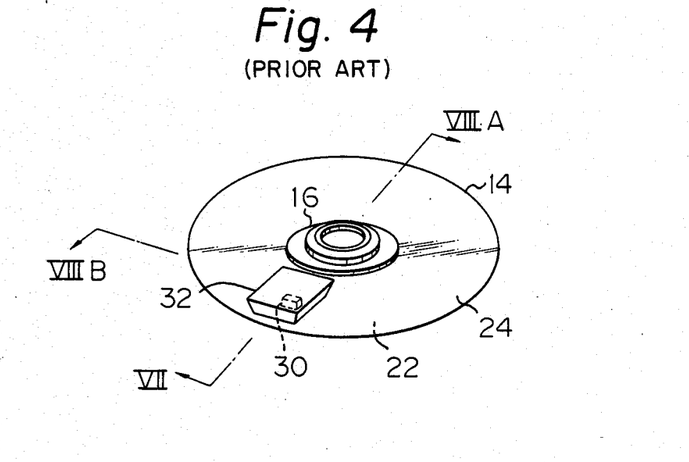
FIG. 4 is a schematic perspective view of an exemplary arrangement in which the position of the magnetic sheet is regulated by a magnetic head and a regulator plate.

For example, the curl h was actually measured to be as large as about 0.3 millimeter (mm) at the minimum and about 1.5–3 mm at the maximum even with a magnetic sheet having a balance coating thereon.

Where a magnetic sheet with such a curl is used for recording or playback purpose, rotating the sheet at, for example, 3,600 rpm is successful to somewhat straighten the curl with the aid of the centrifugal force but not sufficiently. A prior art recording and/or playback apparatus using a magnetic sheet is shown in FIG. 4 which employs a regulator plate 32 as a solution to the above-mentioned curl problem. In FIG. 4, the regulator plate 32 is semipermanently fixed in place adjacent to the back 24 of the magnetic sheet 14 in positional correspondence with a magnetic head 30 which neighbors a recording surface 22 of the sheet 14. When the head 30 urges, or is projected against, the sheet 14, the regulator plate 32 serves to limit the warp of the sheet 14.

Figures 5, 6:
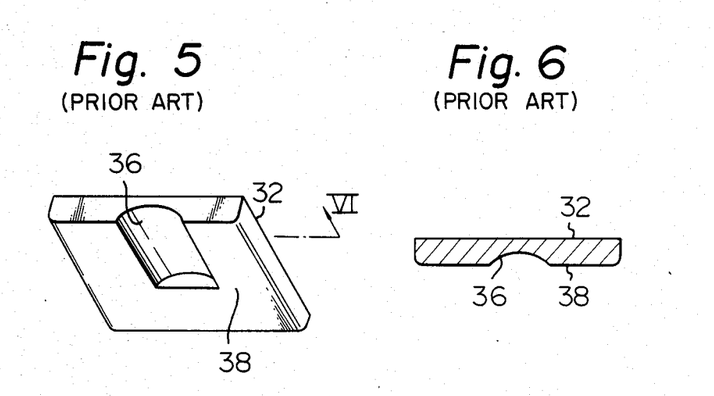
FIG. 5 is a perspective view of the regulator plate shown in FIG. 4.
FIG. 6 is a section taken along line VI of FIG. 5.

An example of the regulator plate 32 is shown in a perspective view in FIG. 5 and in a section along line VI of FIG. 5 in FIG. 6. As shown, the regulator plate 32 has a flat guide surface 38 for guiding the back 24 of the sheet 14. The guide surface 38 is formed with a recess 36 in an intermediate portion thereof which is open at one end thereof.

Figure 7:
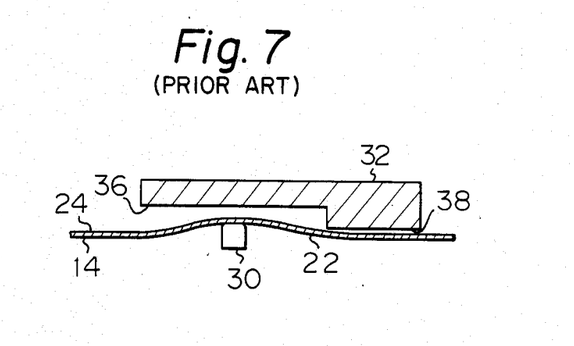
FIGS. 7, 8A and 8B are sections taken respectively along lines VII, VIIIA and VIIIB of FIG. 4.
Figure 8A:
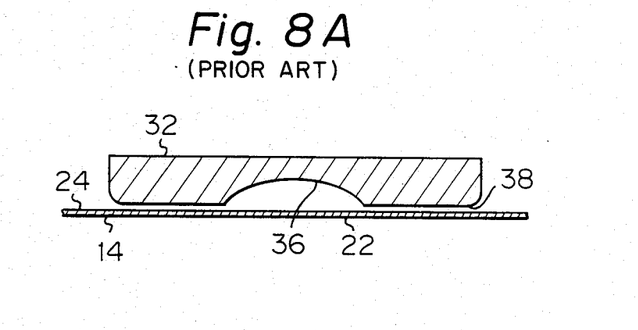
Figure 8B:
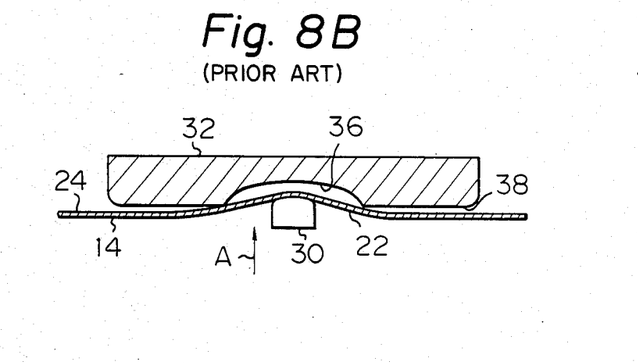

As shown in FIGS. 7, 8A and 8B which are respectively sections along lines VII, VIIIA and VIIIB of FIG. 4, the regulator plate 32 cooperates with the head 30 which is thrust toward the plate 32 in regulating the position of the sheet 14.

In FIG. 8A, the magnetic sheet 14 in an area where the regulator plate 32 is absent (portion shown in the section VIIIA of FIG. 4) is shown in relation with the position of a guide surface 38 of the regulator plate 32.

As shown in FIG. 8A, the magnetic sheet 14 is positioned such that it remains spaced from the guide surface 38 of the regulator plate and does not directly touch it. Meanwhile, in the position where the magnetic head 30 and regulator plate 32 are located (portion shown in the section VIIIB of FIG. 4), the head 30 is protruded toward the recess 36 of the regulator 32 as indicated by an arrow A so that the back 24 of the sheet 14 is partly engaged with the guide surface 38 of the regulator 32 by the protruding force of the head. The regulator 32 at this instant tends to prevent the sheet 14 from warping away from the head 30.

Such a system for position regulation is advantageous in that the sheet can be rotated by a minimum of torque due to the low contact pressure acting between the regulator plate and the magnetic sheet. Despite such regulation, however, a prior art magnetic disc cannot be straightened enough to meet the required relative positional relationship which has to be furnished with an accuracy on the order of, for example, 20 μm.

Figure 9A:
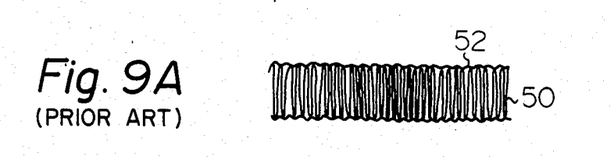
FIGS. 9A and 9B show waveforms representative of exemplary fluctuations appearing during reproduction of a signal recorded on the magnetic disc.
Figure 9B:
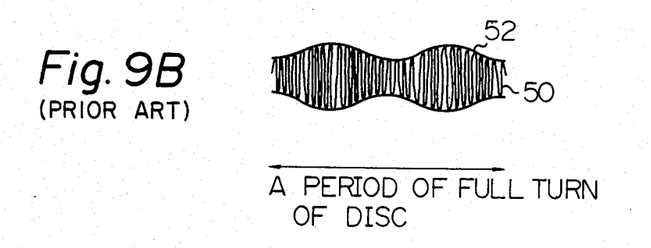

In practice, even if the abutting position of the sheet is limited by the urging force exerted by the coactive regulator and head, signals recorded on or reproduced from the sheet by the head develop high-frequency fluctuation of the envelope as exemplified by FIG. 9A and low-frequency fluctuation of the envelope as exemplified by FIG. 9B.

In FIGS. 9A and 9B, a video signal 50 is shown which is recorded on a magnetic disc by frequency modulating (FM) a color difference signal and a luminance signal, and reproduced from the magnetic disc, with respect to one rotation of the disc. FIG. 9A suggests that even the regulation relying on the coactive regulator 32 and head 30 cannot eliminate small oscillations of that surface of the disc with which the head is in contact. The oscillations are reflected particularly by the high-frequency fluctuation of the envelope 52 of the FM signal 50. Concerning the waveform shown in FIG. 9B, curling of the sheet 14 itself is reflected; if the magnetic material has orientation, its influence will be combined with that of curling.

I recorded and reproduced signals into and from a magnetic sheet with a large curl by using a regulator plate and a magnetic head, and found the recording surface of the magnetic sheet oscillating minutely. Such oscillation appears itself in the signal waveform as high-frequency noise.

Other factors which effect the stability of head contact as critically as the above-described curling of a magnetic disc are the mechanical accuracy of the recording and/or playback mechanism, and whether the disc is properly chucked with the rotary drive shaft.

By thrusting or protruding the head a larger amount toward the regulator plate, an attempt may be made to set up good head contact free from the influence of curling, mechanical accuracy of the disc core and chucking. Such an attempt, however, increases the pressure exerted by the head on the recording surface of the magnetic sheet and, thereby, enhances the wear of the head and the disc to noticeably shorten their lives. This wear problem is especially critical when it comes to a still picture system which reproduces a still picture from a video signal recorded on a magnetic disc, inasmuch as a playback head of the system repeatedly traces a single track when the system is in a playback mode. Thus, recording and playback operations associated with this type of flexible magnetic discs have to satisfy two dilemmatic or contradictory requirements:

(1) The amount of protrusion of the head has to be increased in order to achieve stable head contact; and (2) Taking into account the lives of the head and magnetic sheet as well as the need for repetitive playback, the contact pressure exerted by the head on the magnetic sheet has to be decreased.

SUMMARY OF THE INVENTION

It is therefore an object of the present invention to eliminate the drawbacks inherent in the prior art systems and provide a guide system and method for positioning a rotary magnetic sheet which constantly allows a magnetic head to stably and optimumly abut against, or contact, the magnetic sheet during recording or playback.

In a guide system and method for positioning a rotary magnetic sheet in accordance with the present invention, a regulator plate is so positioned as to contact the back surface of a magnetic recording medium, which is opposite to a recording surface thereof, and held in such a relative position to the recording medium so that a regulation level of the recording surface of the recording medium protrudes toward the recording surface beyond a non-regulation level of the recording surface.

In a guide system for a rotary magnetic sheet in accordance with the present invention, use may be made of a sheet of rotary magnetic recording medium which is configured such that, assuming that the total thickness of the recording medium is t millimeters (mm) and the Young's modulus is E grams per square millimeters (g/mm$^2$), a product of the Young's modulus E and the third power of the total thickness t, i.e. $Et^3$, lies in a range between a lower limit of 2.5 g.mm and an upper limit of 17 g.mm inclusive of the upper and lower limits.

In this specification, the words "system including a regulator plate and performing recording or playback by protruding a magnetic head beyond a regulation level of a rotatable sheet of magnetic recording medium" should be understood to imply a recording or playback system which requires a regulator plate in order to attain stable contact of a head with a sheet of rotary magnetic recording medium, the diameter of which is too small (e.g. about 50 mm) to be stably engaged by the head only with the aid of a centrifugal force, by regulating warp or sway of a recording surface of the medium due to protrusion of the head.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Preferred embodiments of the present invention will be described in detail with reference to the accompanying drawings.

Figure 10A:
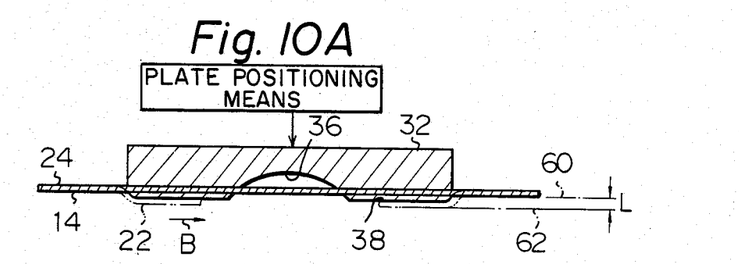
FIGS. 10A and 10B, and 11A and 11B are views, similar to FIGS. 8A and 8B, showing embodiments of the rotary magnetic sheet guide system in accordance with the present invention.
Figure 10B:
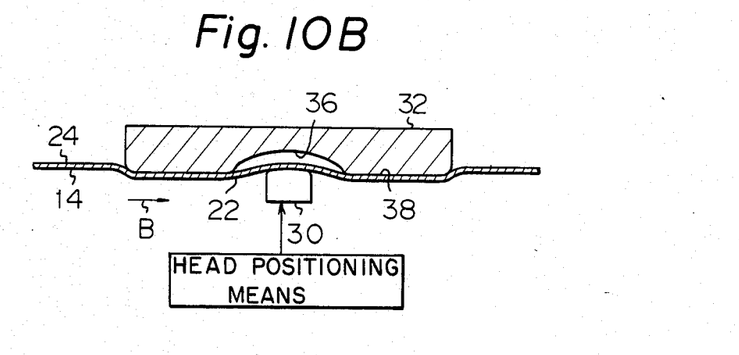

Referring to FIGS. 10A and 10B, a guide system embodying the present invention is shown which is applied to the magnetic recording sheet 14 shown in FIG. 4. FIGS. 10A and 10B are views similar respectively to FIGS. 8A and 8B, and are sectional end views taken respectively along lines VIIIA and VIIIB of FIG. 4.

Figure 14:
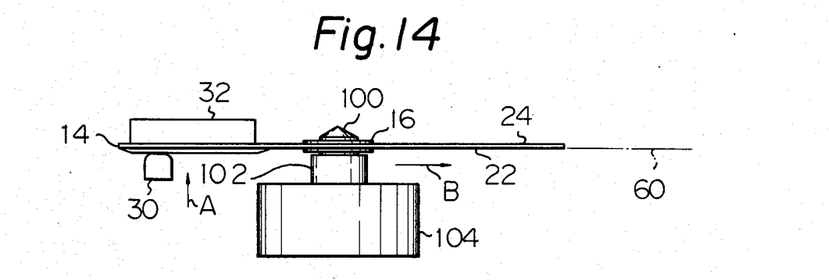
FIG. 14 shows comprehensively the side view of an illustrative embodiment of the magnetic head assembly in accordance with the present invention.

As shown in FIG. 14, a magnetic recording disc 14 is removably supported on core 16 thereof by a chuck 100 of a spindle 102, generally at a predetermined level 60, which is defined as a "non-regulation level" of recording surface 22. The spindle 102 is driven in rotation by an electric motor 104 in the predetermined direction designated by the arrow B. On the recording surface 22, which is coated with a magnetic recording material, magnetic transducer 30 is provided so as to be in contact therewith. On the back surface 24 of sheet 14, regulator plate 32 is positioned in accordance with the teachings of the present invention, as discussed more in detail below.

As shown in FIG. 10A in detail, the magnetic sheet 14 which is rotating, for example, in a direction indicated by an arrow B is held at such a relative level that the back surface 24 of the sheet 14, which is opposite to the recording surface 22, is effected by the guide surface 38 of the regulator plate 32, even in a position where the regulator plate 32 is absent.

In detail, the relative level of the regulator plate 32 to the magnetic sheet 14 is predetermined such that the recording surface 22 of the sheet 14 is positioned at a lower level in its area where the regulator 32 is present, i.e. area regulated by the regulator 32 (indicated by a dash-and-dot line 62 and referred to as "regulation level" hereinafter), than its area where the regulator 32 is absent (indicated by a dash-and-dot line 60 and referred to as "non-regulation level" hereinafter). The "level" mentioned above implies a position with respect to the vertical direction in FIG. 10A. The distance between the regulation level and the non-regulation level, i.e. amount of protuberance, is indicated by L in FIG. 10A.

In a position where the magnetic head 30 is to perform recording or playback on the magnetic sheet 14, the head 30 is thrust or protruded to a position shown in FIG. 10B. In this position, the pressure exerted by the head 30 causes the sheet 14 to partly deform into the recess 36 so that the sheet 14 is brought into sliding contact with the guide surface 38 of the regulator plate 32. In this manner, the regulator plate 32 limits the position of the sheet 14 utilizing the pressure force developed by the head 30.

The unique arrangement shown and described in which the regulation level 62 of the sheet 14 is protruded toward the head 30 relative to the non-regulation level 60 is successful to eliminate the influence of curling or the like deformation on signals.

Figure 11A:
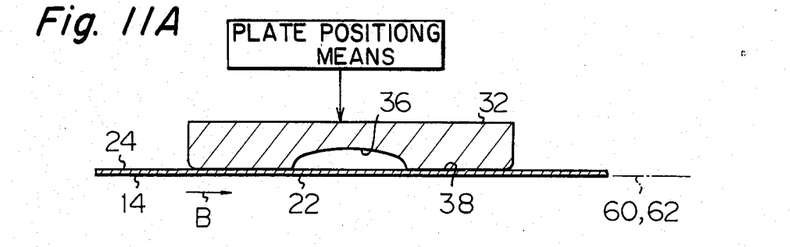
Figure 11B:
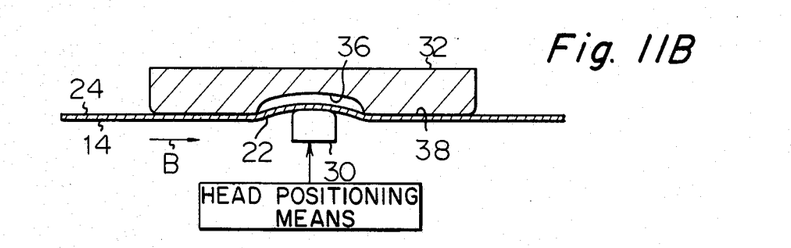

As shown in FIG. 11A, the degree of protrusion L may even be substantially zero. In FIG. 11A, as in FIG. 10A, a portion of sheet 14 where the regulator plate is absent is shown. Nevertheless, the sheet 14 is at a level which allows the guide surface 38 of the regulator plate 32 to abut against the back 24 of the sheet 14; the regulation level 62 is substantially flush with the non-regulation level 60. In a position where the magnetic head 30 is present to perform recording or playback, the head 30 is protruded to a position shown in FIG. 11B. Again, the pressure exerted by the head 30 deforms the sheet 14 partly into the recess 36 to cause the sheet 14, which is rotating in the direction B, into sliding contact with the guide surface 38 of the regulator plate 32. Even in such a critical condition, influence of a curl or the like on the signals is eliminated. It is most preferable to employ a regulator plate which confines the protrusion L to a range of about 30-60 $\mu$m.

Advantageously, a magnetic disc with which the guide system of the present invention is effectively applicable has a magnetic sheet furnished with large elasticity within a certain range which will be described. Paying attention to the total thickness t of the magnetic sheet and its Young's modulus E as of an elastic member, the elasticity may be defined as follows as a condition for providing desirable head contact with stability.

Assuming that a magnetic sheet made up of a base material layer, or support member, and a magnetic recording material layer with or without a balance coating layer has a total thickness t the unit of which is millimeter (mm) and a Young's modulus E the unit of which is gram per square millimeter (g/mm$^2$), it is advantageous to so construct the magnetic sheet as to confine the product of the Young's modulus E by the third power of the total thickness t, i.e. $Et^3$, to within 2.5-17 g.mm inclusive of the upper and lower limits.

The lower limit of the above-described specific range is associated with a critical condition in which while a magnetic head is in the protruded position toward the recess of the regulator plate to hold the magnetic sheet therebetween, the magnetic sheet does not crease when caused into rotation. The upper limit, on the other hand, represents a critical value which would insure desirable head contact even if the magnetic sheet had a curl. That is, although an acceptable extent of head contact is attainable even if the upper limit is exceeded when a curl is absent, the latitude for curling is very narrow.

In a magnetic sheet applicable to the present invention, the product $Et^3$ should preferably have a value selected from the range of 7–36 g.mm and, more preferably, the range of 12–36 g.mm, taking into account the availability of the support member, flatness of the support member, oscillation (appearing as jitter) due to rotation of the disc, etc.

If use is made of a magnetic sheet 14 which is made of a material whose Young's modulus satisfies the above requirements and which has a total thickness also satisfying the above requirements, the guide system for a rotary magnetic sheet in accordance with the present invention will further effectively eliminate the drawbacks inherent in the prior art systems. This presumably is derived from the following reasons.

First, so long as a magnetic sheet satisfies such a condition, an increase in the protruding amount of the head does not essentially increase the contact pressure of the head because the magnetic sheet will sway or warp by a substantial amount. This prevents the life of the head and that of the sheet from being shortened by wear.

Figure 12:
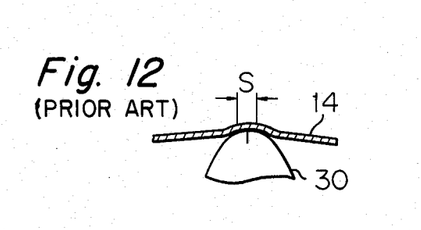
FIGS. 12 and 13 are views useful for understanding different degrees of fit of the magnetic head with the magnetic sheet.
Figure 13:
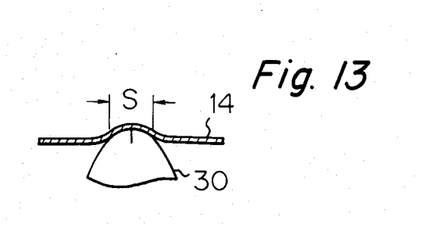

Second, because the magnetic sheet is elastic, it is allowed to contact the head over a substantial area even if the head is protruded by an increased amount. In detail, where the sheet 14 is made of a relatively harder material, the contact area between the sheet 14 and the head 30 is limited as indicated by S in FIG. 12 by way of example. In such a smaller contact area S, the sheet 14 and the head 30 do not get well fit each other failing to attain a sufficient allowance for recording or reproducing signals. In contrast, the material with such elasticity and thickness which satisfy the aforementioned condition attains a relatively larger contact area S as shown in FIG. 13, so that a satisfactory fit is attained between the sheet 14 and the head 30 to offer a substantial allowance for recording or playback.

Third, because the magnetic sheet itself is thin and elastic, any curling thereof will be sufficiently removed between the magnetic head and the regulator plate. This substantially frees the head contact surface from the influence of curling.

It will be seen from the foregoing that in accordance with the present invention a relative position of a regulator plate to a magnetic sheet is preselected such that a regulation level of a recording surface of the sheet is protruded toward a magnetic head relative to a nonregulation level, thereby constantly insuring desirable contact of the head with the sheet. More specifically, video signals or like information signals are freed from the influence of curling or that of oscillation of the recording surface, while the sheet and head serve a long time of operation.

The effect described above will become far more prominent when a flexible magnetic disc with large elasticity is used.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A magnetic head assembly for use with a small-sized, rotary disc sheet of magnetic recording medium having a recording surface and a back surface, opposite to the recording surface, comprising:

supporting means for rotatably supporting a major portion of the sheet at a predetermined level in a direction perpendicular to the recording and back surfaces of the sheet, said predetermined level defining a dynamic plane of rotation of the sheet;

magnetic head means arranged in contact with the recording surface for performing recording or playback on the recording surfaces;

a regulator plate positioned opposite said back surface of the sheet, and having a main surface and a recess formed thereon opposingly to said head means, said main surface being opposite to a minor portion of the back surface of the sheet to define a regulation level of the recording surface of the sheet;

means for positioning said magnetic head means to protrude a portion of the sheet into the recess beyond the regulation level; and means for positioning the main surface of said regulator plate at least into the dynamic plane of rotation of the sheet or protruded a distance beyond said dynamic plane of rotation in a direction toward said recording surface of the sheet;

whereby swaying of the sheet is minimized.

2. A magnetic head assembly in accordance with claim 1 wherein the main surface of said regulator plate is spaced from the dynamic plane of rotation in a direction toward said recording surface.

3. The magnetic head assembly in accordance with claim 2, wherein said sheet of magnetic recording medium comprises an elastic material having a total thickess of t millimeters (mm) and a Young's modulus of E grams per square millimeters (g/mm$^2$) with a product of the Young's modulus E by the third power of the total thickness t, Et$^3$, lying in a range between a lower limit of 2.5 g.mm and an upper limit of 36 g.mm inclusive of said upper and lower limits.

4. A magnetic head assembly in accordance with claim 1, wherein the main surface of said regulator plate is substantially coplanar with said dynamic plane of rotation.

5. The magnetic head assembly in accordance with claim 4, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, Et$^3$, lying in a range between a lower limit of 2.5 g.mm and an upper limit of 36 g.mm inclusive of said upper and lower limits.

6. A magnetic head assembly in accordance with claim 1, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, Et$^3$, lying in a range between a lower limit of 2.5 g.mm and an upper limit of 36 g.mm inclusive of said upper and lower limits.

7. The magnetic head assembly in accordance with claim 1, wherein the distance that the main surface of the regulator plate protrudes beyond the dynamic plane of rotation is from about 30 $\mu$m to about 60 $\mu$m.

8. The magnetic head assembly in accordance with claim 7, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, Et$^3$, lying in a range between a lower limit of 2.5 g.mm and an upper limit of 36 g.mm inclusive of said upper and lower limits.

9. A method of positioning a small-sized rotary disc sheet of magnetic recording medium having a recording surface and a back surface, opposite to the recording surface, with respect to a magnetic head assembly comprising the steps of:
- rotatably supporting a major portion of the sheet at a predetermined level in a direction perpendicular to the recording and back surfaces of the sheet, said predetermined level defining a dynamic plane of rotation of the sheet;
- contacting magnetic head means with the recording surface for performing recording or playback on the recording surface;
- positioning a regulator plate opposite the back surface of the sheet, said regulator plate having a main surface and a recess formed thereon opposingly to said head means, said main surface being opposite to a minor portion of the back surface of the sheet at positions adjacent said head means to define a regulation level of the recording surface of the sheet;
- positioning said magnetic head means against the recording surface so as to protrude a portion of the sheet into the recess beyond the regulation level; and
- positioning said main surface of said regulator plate at least into the dynamic plane of rotation of the sheet or protruded a distance beyond said dynamic plane of rotation in a direction toward said recording surface of the sheet;
- whereby swaying of the sheet is minimized.

10. The method of claim 9, wherein the distance that the main surface of the regulator plate protrudes beyond the dynamic plane of rotation is from about 30 μm to about 60 μm.

11. The method of claim 9, wherein the main surface of said regulator plate is spaced from the dynamic plane of rotation in a direction toward said recording surface.

12. The method of claim 9, wherein the main surface of said regulator plate is substantially coplanar with said dynamic plane of rotation.

13. The method of claim 9, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, $Et^3$, lying in a range between a lower limit of 2.5 g.mm and an upper limit of 36 g.mm inclusive of said upper and lower limits.

14. The method of claim 10, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, $Et^3$, lying in a range between a lower limit of 2.5 g.mm and an upper limit of 36 g.mm inclusive of said upper and lower limits.

15. The method of claim 11, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, $Et^3$, lying in a range between a lower limit of 2.5 g.mm and an upper limit of 36 g.mm inclusive of said upper and lower limits.

16. The method of claim 12, wherein said sheet of magnetic recording medium comprises an elastic material having a total thickness of t millimeters (mm) and a Young's modulus of E grams per square millimeters (g/mm$^2$), with a product of the Young's modulus E by the third power of the total thickness t, $Et^3$, lying in a range between a lower limit of 2.5 g.mm and an upper limit of 36 g.mm inclusive of said upper and lower limits.

* * * * *